US009455640B2

(12) United States Patent
Ohtake

(10) Patent No.: US 9,455,640 B2
(45) Date of Patent: Sep. 27, 2016

(54) SWITCHING POWER-SUPPLY DEVICE

(71) Applicant: Sanken Electric Co., LTD., Niiza-shi, Saitama (JP)

(72) Inventor: Osamu Ohtake, Niiza (JP)

(73) Assignee: Sanken Electric Co., LTD., Niiza-shi, Saitama (JP)

( * ) Notice: Subject to any disclaimer, the term of this patent is extended or adjusted under 35 U.S.C. 154(b) by 0 days.

(21) Appl. No.: 14/627,285

(22) Filed: Feb. 20, 2015

(65) Prior Publication Data
US 2016/0248332 A1 Aug. 25, 2016

(51) Int. Cl.
*H02M 3/335* (2006.01)
*H02M 7/48* (2007.01)

(52) U.S. Cl.
CPC ....... *H02M 3/33546* (2013.01); *H02M 7/4826* (2013.01); *H02M 2007/4815* (2013.01); *H02M 2007/4818* (2013.01)

(58) Field of Classification Search
None
See application file for complete search history.

(56) References Cited

U.S. PATENT DOCUMENTS

| | | | | |
|---|---|---|---|---|
| 8,411,469 B2* | 4/2013 | Chen | ............... | H02M 3/33592 363/127 |
| 8,582,321 B2* | 11/2013 | Li | ................ | H02M 3/3376 363/21.02 |
| 8,897,036 B2* | 11/2014 | Chen | ............... | H02M 1/38 363/21.02 |
| 8,923,018 B2* | 12/2014 | Hu | ................ | H02M 3/33569 363/21.02 |
| 2007/0274108 A1* | 11/2007 | Jacques | ............ | H02M 3/33507 363/21.12 |
| 2008/0247194 A1* | 10/2008 | Ying | ............... | H02M 3/3376 363/17 |
| 2013/0188099 A1 | 7/2013 | Higashi et al. | | |
| 2013/0301308 A1* | 11/2013 | Hosotani | ............ | H02M 3/3381 363/21.03 |
| 2014/0036552 A1* | 2/2014 | Saji | ............... | H02M 1/44 363/21.17 |

FOREIGN PATENT DOCUMENTS

| | | |
|---|---|---|
| JP | H11-129538 A | 5/1999 |
| JP | 2005-198456 A | 7/2005 |
| JP | 2009-112123 A | 5/2009 |

* cited by examiner

*Primary Examiner* — Jessica Han
*Assistant Examiner* — Demetries A Gibson
(74) *Attorney, Agent, or Firm* — Banner & Witcoff, Ltd.

(57) ABSTRACT

A switching power-supply device includes: a transformer including a primary coil and a secondary coil; a rectifying-and-smoothing circuit; a series circuit including a first switching element and a second switching element; a series resonant circuit including a capacitor connected to the second switching element and the primary coil; a controller performing switching control to alternately turn on and off the first switching element and the second switching element with a dead time; and a resonant-current detection unit that detects a resonant current, wherein in a case where the first switching element is in an ON state at a timing when the absolute value level of the resonant current becomes equal to or less than a threshold value, the controller switches the first switching element to an OFF state and makes a subsequent ON period of the first switching element shorter than a last ON period.

4 Claims, 3 Drawing Sheets

SWITCHING POWER-SUPPLY DEVICE

TECHNICAL FIELD

This disclosure relates to a switching power-supply device.

BACKGROUND ART

A power source of an electronic device such as a television set, a smart phone, or a personal computer should stably supply a constant DC voltage. As this power source, a resonance type switching power-supply device is used.

A resonance type switching power-supply device uses a semiconductor device such as a Metal-Oxide-Semiconductor Field-Effect Transistor (MOSFET), an Insulated Gate Bipolar Transistor (IGBT), or a thyristor as a switching element, and temporarily converts an input DC voltage into an AC voltage by turning on-and-off the switching element. The converted AC voltage is converted into a stable DC voltage by passing through a transformer, a rectifier circuit, and a smoothing circuit in the order of them, and the stable DC voltage is output.

In this switching power-supply device, the switching frequency of the switching element is controlled according to the output voltage, whereby the output voltage is stabilized. As for the control range of the switching frequency, a frequency range higher than the resonant frequency of a resonant circuit which is made up of a capacitor and an inductor is regarded as a normal control range. In order to widen the control range of the output voltage as much as possible, there is a case where it is tried to bring the lower limit frequency of the switching frequency as close to the resonant frequency as possible. However, if there are variations in the characteristics of elements to make up circuits, in the above-mentioned case, so-called off-resonance, in which the switching frequency becomes lower than the resonant frequency outside the normal range, may occur.

In Japanese Patent Application Laid-Open No. 2009-112123, there is disclosed a switching power-supply device which reads data on the voltage between both ends of a switching element, and converts the data into numerical values, and compares the maximum value of the data with a predetermined value, thereby estimating an abnormal operation.

In Japanese Patent Application Laid-Open No. 2005-198456 and No. 2013-188099, there are disclosed switching power-supply devices which perform overcurrent protection by reversing the ON/OFF states of a pair of switching elements if off-resonance is detected by comparing a resonant current with a predetermined current value.

SUMMARY

There is a case where the load of the output side suddenly increases in an electronic device equipped with a switching power-supply device. In this case, if the switching frequency of a switching element is suddenly raised in order to eliminate off-resonance, supplying of power to the secondary side is not sufficiently performed. The above described background technologies are capable of protection against overcurrent attributable to off-resonance, but cannot sufficiently perform supplying of the power if the load of the output side is suddenly varied.

This disclosure was made in view of the above-mentioned circumstances, and an object of this disclosure is to provide a switching power-supply device capable of preventing off-resonance, even in a case where a load changes significantly, and capable of sufficiently performing supply of power to the secondary side.

A switching power-supply device of this disclosure includes: a transformer including a primary coil and a secondary coil which is magnetically coupled with the primary coil; a rectifying-and-smoothing circuit connected to the secondary coil; a series circuit, which includes a first switching element and a second switching element and is connected to both ends of a DC power source; a series resonant circuit including a capacitor, which is connected to one end of the second switching element, and the primary coil, which is connected between the capacitor and the other end of the second switching element; a controller that performs switching control to alternately turn on and off the first switching element and the second switching element, with a dead time in which both the first switching element and the second switching element are tuned off; and a resonant-current detection unit that detects a resonant current flowing in the series resonant circuit, wherein in a case where the first switching element is in an ON state at a timing when an absolute value level of the resonant current becomes equal to or less than a threshold value, the controller changes the first switching element to an OFF state and makes a subsequent ON period of the first switching element shorter than a last ON period.

Another switching power-supply device of this disclosure includes: transformer including a primary coil and a secondary coil which is magnetically coupled with the primary coil; a rectifying-and-smoothing circuit connected to the secondary coil; a series circuit, which includes a first switching element and a second switching element and is connected to both ends of a DC power source; a series resonant circuit that includes a capacitor, which is connected to one end of the second switching element, and the primary coil, which is connected between the capacitor and the other end of the second switching element; a controller that performs switching control to alternately turn on and off the first switching element and the second switching element, with a dead time in which both the first switching element and the second switching element are turned off; and a resonant-current detection unit that detects a resonant current flowing in the series resonant circuit, wherein in a case where the second switching element is in an ON state at a timing when an absolute value level of the resonant current becomes equal to or less than a threshold value, the controller switches the second switching element to an OFF state and makes a subsequent ON period of the second switching element shorter than a last ON period.

According to a switching power-supply device of this disclosure, it is possible to provide a switching power-supply device capable of preventing off-resonance, even in a case where a load changes significantly, and capable of sufficiently performing supplying of the power to the secondary side.

DESCRIPTION OF EXEMPLARY EMBODIMENT

Hereinafter, an embodiment of this disclosure will be described with reference to the accompanying drawings.

Figure 1:
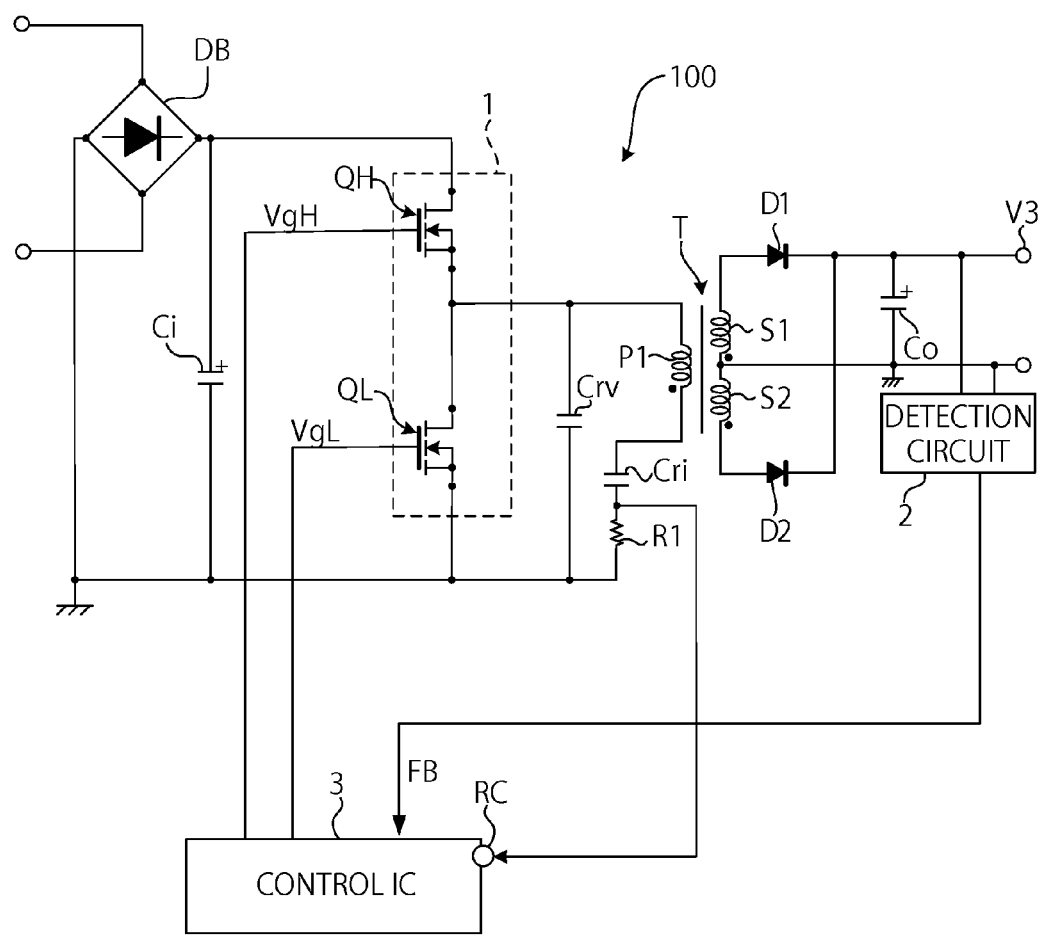
FIG. 1 is a view schematically illustrating the configuration of a switching power-supply device 100 for explaining an embodiment of the present invention.

FIG. 1 is a view schematically illustrating the configuration of a switching power-supply device 100 for explaining an embodiment of this disclosure.

The switching power-supply device 100 rectifies the output of an AC power source (not shown) by a diode bridge circuit DB, and smoothens the output by a smoothing capacitor Ci, thereby obtaining power as a DC input power source.

The switching power-supply device 100 includes a series circuit 1 connected to both ends of the capacitor Ci, capacitors Cri and Crv, a current detection resistor R1, a transformer T, diodes D1 and D2, a capacitor Co, an error signal detection circuit 2, and a controller (a control IC) 3.

The series circuit 1 includes a switching element QH which is made up of a semiconductor element (in the example of FIG. 1, a MOSFET) controllable to be turned on or off, such as a MOSFET, an IGBT, and a thyristor, and a switching element QL (in the example of FIG. 1, a MOSFET) which is connected in series to the switching element QH.

To both ends of the switching element QL in the series circuit 1, the series circuit including the primary coil P1 of the transformer T, the capacitor Cri and the current detection resistor R1 and the capacitor Crv are connected in parallel. To one end (on the ground terminal side) of the switching element QL, one end of the capacitor Crv and one end of the current detection resistor R1 are connected, and to the other end (on the switching element (QH) side) of the switching element QL, the other end of the capacitor Crv and one end of the primary coil P1 are connected.

A series circuit which is made up of the primary coil P1 of the transformer T and the capacitor Cri makes up a series resonant circuit, which is connected in parallel to the switching element QL.

The transformer T includes the primary coil P1, and secondary coils S1 and S2 which are magnetically coupled with the primary coil P1.

One end (the side being connected to the secondary coil S2) of the secondary coil S1 is connected to a ground terminal, and the other end of the secondary coil S1 is connected to the anode of the diode D1.

One end of the secondary coil S2 (the side being connected to the secondary coil S1) is connected to the ground terminal GND, and the other end of the secondary coil S2 is connected to the anode of the diode D2. The cathodes of the diodes D1 and D2 are connected to an output terminal V3.

The capacitor Co is connected between the connection point of the secondary coil S1 and the secondary coil S2 and the output terminal V3. The diodes D1 and D2 are for rectifying voltages which are generated at the secondary coils S1 and S2. The capacitor Co is for smoothing a voltage which is generated at the secondary coil S1 or S2. The diodes D1 and D2 and the capacitor Co make up rectifying-and-smoothing circuits which are connected to the secondary coils S1 and S2.

The current detection resistor R1 is connected between the capacitor Cri and the ground terminal, and the connection point of the current detection resistor R1 and the capacitor Cri is connected to the input terminal RC of the controller 3. According to this configuration, a voltage signal Icri according to a resonant current flowing in the series resonant circuit is input from the input terminal RC to the controller 3.

The current detection resistor R1 and a wire drawn from the connection point of the current detection resistor R1 and the capacitor Cri make up a resonant-current detection unit which detects the resonant current flowing in the series resonant circuit.

The error signal detection circuit 2 detects a difference between an output voltage of the secondary side rectifying-and-smoothing circuit and a target voltage (an error signal). The controller 3 includes a photocoupler for transmitting the error signal to the controller 3.

The controller 3 performs switching control to alternately turn on and off the switching element QH and the switching element QL, a dead time in which both the switching element QH and the switching element QL are turned off. The controller 3 generates drive signals VgH and VgL which are gate control signals of the switching elements QH and QL, and supplies the drive signals to the switching elements QH and QL. The controller 3 changes the frequency of the drive signals (a switching frequency) according to a signal from the secondary side, thereby performing pulse frequency modulation (PFM) control such that the output voltage becomes the target voltage.

Also, in a case where the switching element QH is in an ON state at a timing when an absolute value level of the voltage signal Icri corresponding to the resonant current which is input from the input terminal RC becomes equal to or less than a threshold value (a case where the drive signal VgH is output), the controller 3 switches the switching element QH from the ON state to an OFF state and then performs control such that a subsequent ON period of the switching element QH becomes shorter than a last ON period.

Also, in a case where the switching element QL is in an ON state at a timing when an absolute value level of the voltage signal Icri corresponding to the resonant current which is input from the input terminal RC becomes equal to or less than the threshold value (a case where the drive signal VgL is output), the controller 3 switches the switching element QL from the ON state to an OFF state and performs control such that a subsequent ON period of the switching element QL becomes shorter than a last ON period.

Due to this control, even if a load changes significantly, it is possible to gradually raise the switching frequency without suddenly raising the switching frequency. Therefore, it is possible to sufficiently secure power to be supplied to the secondary side while preventing off-resonance.

Figure 2:
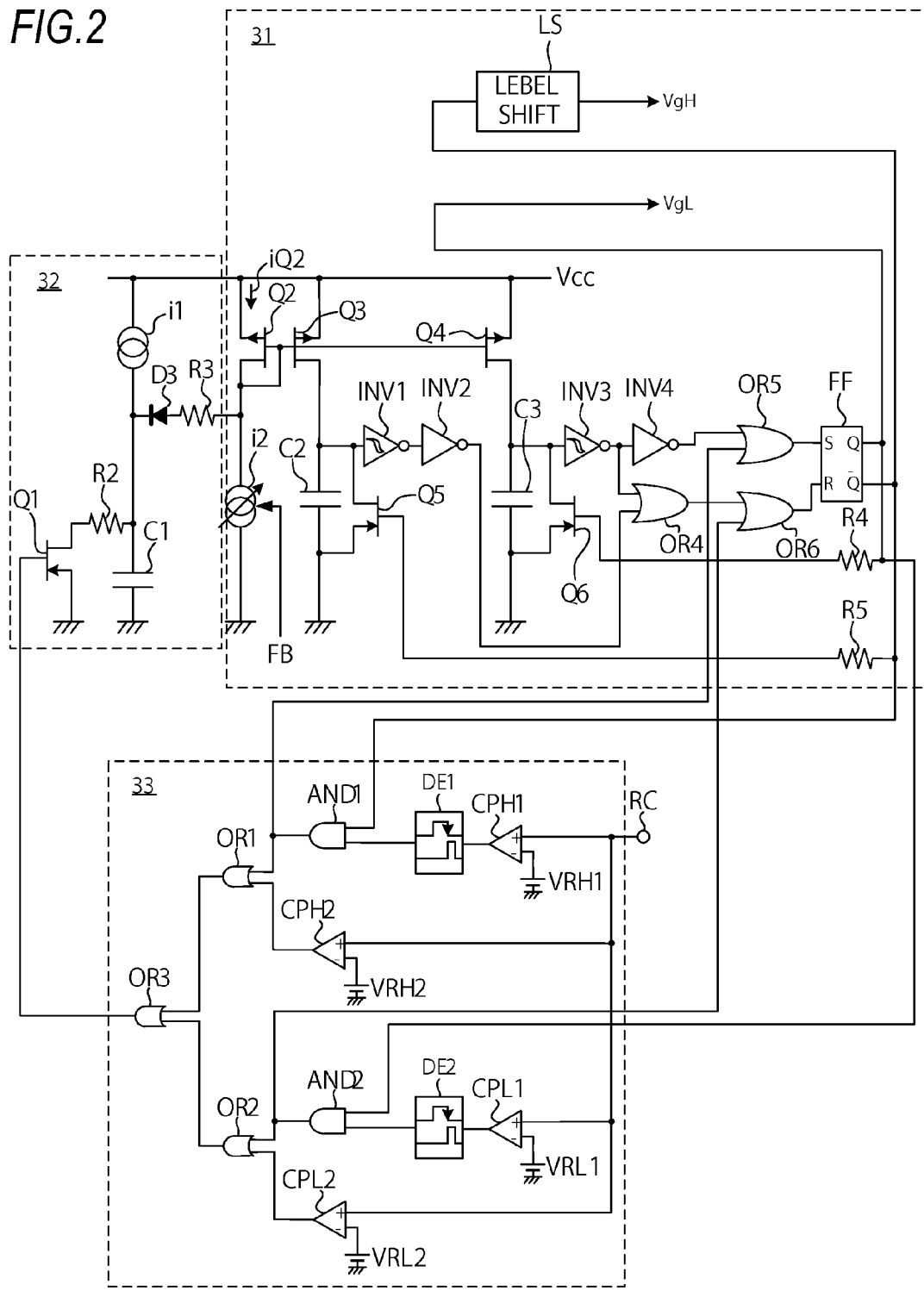
FIG. 2 is a view illustrating an example of the circuit configuration of a controller 3 of the switching power-supply device 100 shown in FIG. 1.

FIG. 2 is a view illustrating an example of the circuit configuration of the controller 3 of the switching power-supply device 100 shown in FIG. 1.

The controller 3 includes a PFM control circuit 31, which changes the switching frequency according to an error signal FB fed back from the secondary side to perform PFM control such that the output voltage becomes the target voltage, a soft start circuit 32, which controls a reference current according to the error signal FB input to the PFM control circuit 31 to gradually increase the resonant current flowing in the series resonant circuit (in other words, the switching frequency), and a soft start operation control circuit 33 which controls the operation of the soft start circuit 32.

The soft start operation control circuit 33 includes AND circuits AND1 and AND2, OR circuits OR1, OR2, and OR3, down-edge detection circuits DE1 and DE2, comparators CPH1 and CPH2, and comparators CPL1 and CPL2.

The input terminal RC is connected to the non-inverted input terminal of the comparator CPH1, and a power source for supplying a reference voltage VRH1 is connected to the inverted input terminal of the comparator CPH1.

The comparator CPH1 outputs a high-level signal in a case where the absolute value level of the voltage signal Icri input to the input terminal RC exceeds the reference voltage VRH1, and outputs a low-level signal in a case where the absolute value level of the voltage signal Icri becomes equal to or less than the reference voltage VRH1.

The output terminal of the comparator CPH1 is connected to the input terminal of the down-edge detection circuit DE1. The down-edge detection circuit DE1 outputs a high-level signal having a predetermined ON width in sync with a falling of the output signal of the comparator CPH1.

The output terminal of the down-edge detection circuit DE1 is connected to one terminal of two input terminals of the AND circuit AND1. To the other terminal of the two input terminals of the AND circuit AND1, a signal corresponding to the drive signal VgH generated by the PFM control circuit 31 (a signal which is the same as the drive signal VgH in switching timings between a high level and a low level) is input.

Therefore, the output of the AND circuit AND1 becomes a high level for only a predetermined time, only in a case where the drive signal VgH is at the high level at a timing when an absolute value level of the voltage signal Icri becomes equal to or less than the reference voltage VRH1.

The output signal of the AND circuit AND1 is input to each of the OR circuit OR1 and an OR circuit OR5 (to be described below) included in the PFM control circuit 31.

To the non-inverted input terminal of the comparator CPH2, the input terminal RC is connected, and to the inverted input terminal of the comparator CPH2, a power source for supplying a reference voltage VRH2 is connected.

The comparator CPH2 is provided for overcurrent protection, and it outputs a low-level signal in a case where the absolute value level of the voltage signal Icri is equal to or less than the reference voltage VRH2 and outputs a high-level signal in a case where the absolute value level of the voltage signal Icri exceeds the reference voltage VRH2. The output signal of the comparator CPH2 is input to the OR circuit OR1.

The OR circuit OR1 outputs a high-level signal in a period where any one of the output signal of the AND circuit AND1 and the output signal of the comparator CPH2 is at the high level. The output signal of the OR circuit OR1 is input to the OR circuit OR3.

The input terminal RC is connected to the non-inverted input terminal of the comparator CPL1, and a power source for supplying a reference voltage VRL1 is connected to the inverted input terminal of the comparator CPL1.

The comparator CPL1 outputs a high-level signal in a case where the absolute value level of the voltage signal Icri input to the input terminal RC exceeds the reference voltage VRL1, and outputs a low-level signal if the absolute value level of the voltage signal Icri becomes equal to or less than the reference voltage VRL1.

The output terminal of the comparator CPL1 is connected to the input terminal of the down-edge detection circuit DE2. The down-edge detection circuit DE2 outputs a high-level signal having a predetermined ON width in sync with a falling of the output signal of the comparator CPL1.

The output terminal of the down-edge detection circuit DE2 is connected to one terminal of two input terminals of the AND circuit AND2. To the other terminal of the two input terminals of the AND circuit AND2, the drive signal VgL generated by the PFM control circuit 31 is input.

Therefore, the output of the AND circuit AND2 becomes a high level for only a predetermined time, only in a case where the drive signal VgH is at the high level at a timing when an absolute value level of the voltage signal Icri becomes equal to or less than the reference voltage VRL1.

The output signal of the AND circuit AND2 is input to each of the OR circuit OR2 and an OR circuit OR6 (to be described below) included in the PFM control circuit 31.

To the non-inverted input terminal of the comparator CPL2, the input terminal RC is connected, and to the inverted input terminal of the comparator CPL2, a power source for supplying a reference voltage VRL2 is connected.

The comparator CPL2 is provided for overcurrent protection, and it outputs a low-level signal in a case where the absolute value level of the voltage signal Icri is equal to or less than the reference voltage VRL2 and outputs a high-level signal in a case where the absolute value level of the voltage signal Icri exceeds the reference voltage VRL2. The output signal of the comparator CPL2 is input to the OR circuit OR2.

The OR circuit OR2 outputs a high-level signal in a period where any one of the output signal of the AND circuit AND2 and the output signal of the comparator CPL2 is at the high level. The output signal of the OR circuit OR2 is input to the OR circuit OR3.

The soft start circuit 32 includes a transistor Q1 which serves as a switching element, resistors R2 and R3, a capacitor C1, a current source i1, and a diode D3.

The series circuit of the current source i1 and the capacitor C1 is connected between a power source terminal for supplying a power voltage Vcc and the ground terminal. The capacitor C1 is charged by a current which is supplied from the current source i1.

One end of the resistor R2 is connected to the connection point of the current source i1 and the capacitor C1, and the drain terminal of the transistor Q1 is connected to the other end of the resistor R2. The resistor R2 and the capacitor C1 make up a time constant circuit.

The output terminal of the OR circuit OR3 is connected to the gate terminal of the transistor Q1, and the source terminal of the transistor Q1 is grounded. The transistor Q1 becomes an ON state when the high-level signal is input from the OR circuit OR3 and becomes an OFF state when the low-level signal is input.

The cathode of the diode D3 is connected to the connection point of the current source i1 and the resistor R2. One end of the resistor R3 is connected to the anode of the diode D3.

The PFM control circuit 31 includes a current source i2, transistors Q2 to Q6, inverters INV1 to INV4, OR circuits OR4 to OR6, capacitors C2 and C3, resistors R4 and R5, an SR flip-flop FF, and a level shift circuit LS.

The source terminal of the transistor Q2 is connected to the power source terminal for supplying the power source voltage Vcc. The current source i2 is connected between the drain terminal of the transistor Q2 and the ground terminal.

The current source i2 is, for example, a photocoupler, and supplies a current according to the error signal FB detected by the error signal detection circuit 2, to the transistor Q2.

The other end of the resistor R3 of the soft start circuit 32 is connected to the connection point of the transistor Q2 and the current source i2. Due to this connection relation, when the transistor Q1 is in the ON state, the capacitor C1 is discharged, whereby a current iQ2 flowing in the transistor Q2 increases.

The transistor Q3 and the transistor Q4 each make up a current mirror circuit with the transistor Q2. Therefore, in the transistor Q3 and the transistor Q4, a current iQ2 proportional to the current iQ2 flowing in the transistor Q2 flows.

The capacitor C2 is connected between the transistor Q3 and the ground terminal. The capacitor C2 is charged by the transistor Q3.

The transistor Q5 is connected between both terminals of the capacitor C2. A signal corresponding to the drive signal VgH described above is input to the gate terminal of the transistor Q5 through the resistor R5. According to this signal, the transistor Q5 is controlled so as to be turned on or off, whereby the capacitor C2 repeats charging and discharging.

The inverter INV1 is connected to the connection point of the transistor Q3 and the capacitor C2, and the inverter INV2 is connected to the output terminal of the inverter INV1. The capacitor C2, the inverter INV1, the inverter INV2, and the transistor Q5 make up an oscillation circuit for generating the drive signal VgH.

The capacitor C3 is connected between the transistor Q4 and the ground terminal. The capacitor C3 is charged by the transistor Q4.

The transistor Q6 is connected between both terminals of the capacitor C3. The drive signal VgL is input to the gate terminal of the transistor Q6 through the resistor R4, such that the transistor Q6 is controlled so as to be turned on or off according to the drive signal VgL, whereby the capacitor C3 repeats charging and discharging.

The inverter INV3 is connected to the connection point of the transistor Q4 and the capacitor C3, and the inverter INV4 is connected to the output terminal of the inverter INV3. The capacitor C3, the inverter INV3, the inverter INV4, and the transistor Q6 make up an oscillation circuit for generating the drive signal VgL.

The output terminal of the inverter INV2 and the output terminal of the inverter INV3 are connected to the input terminals of the OR circuit OR4.

The output terminal of the inverter INV4 and the output terminal of the AND circuit AND1 of the soft start operation control circuit 33 are connected to the input terminals of the OR circuit OR5.

The output terminal of the OR circuit OR4 and the output terminal of the AND circuit AND2 of the soft start operation control circuit 33 are connected to the input terminals of the OR circuit OR6.

The set terminal S of the SR flip-flop FF is connected to the output terminal of the OR circuit OR5. The reset terminal R of the SR flip-flop FF is connected to the output terminal of the OR circuit OR6.

The Q terminal of the SR flip-flop FF is connected to the gate terminal of the switching element QL, the opposite terminal of the resistor R4 to the connection point with the transistor Q6 and an input terminal of the AND circuit AND2.

The $\overline{Q}$ terminal of the SR flip-flop FF is connected to the level shift circuit LS, the opposite terminal of the resistor R5 to the connection point with the transistor Q5 and an input terminal of the AND circuit AND1.

The level shift circuit LS level-shifts an input signal and supplies the level-shifted signal as the drive signal VgH to the switching element QH.

The operation of the controller 3 configured as described above will be described.

Figure 3:
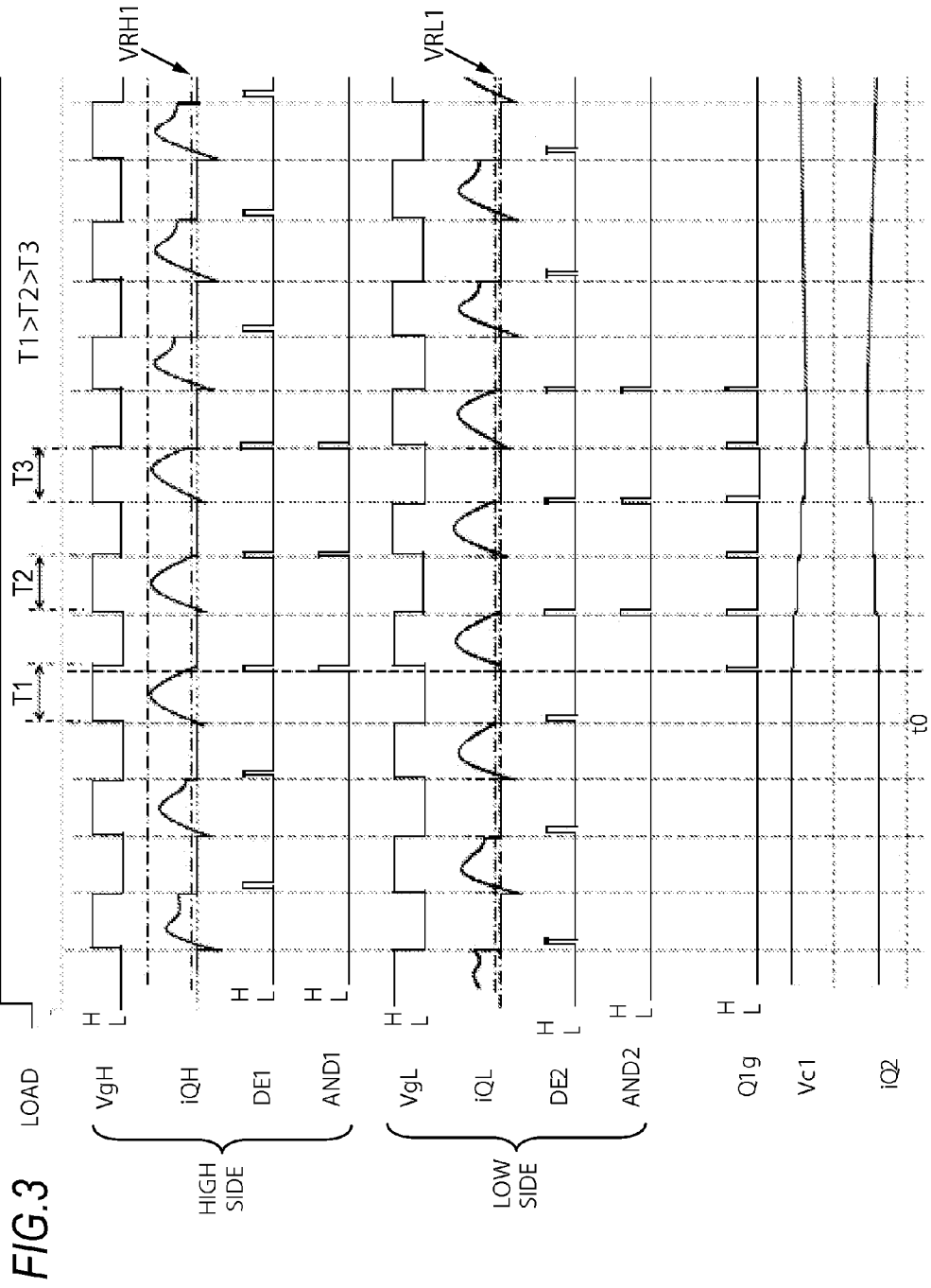
FIG. 3 is a flow chart for explaining the operation of the switching power-supply device 100 shown in FIG. 1.

FIG. 3 is a timing chart for explaining the operation of the switching power-supply device 100.

In FIG. 3, "LOAD" represents an activation signal of the device. "iQH" represents the drain current of the switching element QH. "DE1" represents the output of the down-edge detection circuit DE1. "AND1" represents the output of the AND circuit AND1. "iQL" represents the drain current of the switching element QL. "DE2" represents the output of the down-edge detection circuit DE2. "AND2" represents the output of the AND circuit AND2. "Q1g" represents a signal which is input to the gate terminal of the transistor Q1 of the soft start circuit 32. "Vc1" represents the voltage of the capacitor C1 of the soft start circuit 32.

In a case where the switching element QH is turned on at a time point t0 and is maintained for only a period T1, if the absolute value level of the voltage signal Icri reaches the reference voltage VRH1 in the period T1, the output of the AND circuit AND1 is maintained at the high level for a predetermined time.

If the output of the AND circuit AND1 becomes the high level, since the output of the OR circuit OR5 becomes the high level, and the SR flip-flop FF is set, the drive signal VgH becomes the low level and the switching element QH becomes the OFF state.

Also, if the output of the AND circuit AND1 becomes the high level, the outputs of the OR circuit OR1 and the OR circuit OR3 also become the high levels, and then the transistor Q1 becomes the ON state for only the predetermined time. Since the transistor Q1 becomes the ON state for only the predetermined time, the voltage Vc1 of the capacitor C1 slightly decreases, and the current iQ2 slightly increases accordingly.

Since the current iQ2 slightly increases, the charging currents of the capacitors C2 and C3 increase. Therefore, a period where the drive signal VgH becomes the high level (the ON period of the switching element QH) is changed to a period (a period T2 of FIG. 3) shorter than the ON period (the period T1 of FIG. 3) set at the time point t0.

Between the period T1 and the period T2, the drive signal VgL of the switching element QL becomes the high level. However, in a period where the drive signal VgL is at the high level, if the absolute value level of the voltage signal Icri reaches the reference voltage VRL1, the switching element QL becomes the OFF state and then the current iQ2 slightly increases again. Therefore, a subsequent ON period of the switching element QL becomes shorter than a last ON period.

In the above described way, whenever a situation, in which the switching element QH is at the ON state at a timing when an absolute value level of the voltage signal Icri reaches the reference voltage VRH1 occurs, or a situation, in which the switching element QL is at the ON state at a timing when an absolute value level of the voltage signal Icri reaches the reference voltage VRL1, occurs, the current iQ2 gradually increases, and the switching frequency gradually increases accordingly.

As described above, the capacitor C1 of the soft start circuit 32 is gradually discharged by a one-shot pulse whenever off-resonance occurs. Therefore, it is capable of supplying of power to the secondary side without carelessly shortening the ON periods of the switching elements QH and QL.

As a result, even in a case where a load dynamically changes, it is capable of restricting of the switching frequency without suddenly performing overcurrent limitation.

Therefore, the switching frequency can be maintained at a frequency at which it is capable of supplying of the power, without transitioning to the highest switching frequency according to off-resonance prevention.

Although the present invention has been described above by the specific embodiment, it goes without saying that the above described embodiment is an example and various modifications may be made without departing from the spirit and the scope of the present invention.

As described above, this specification discloses the following items.

A disclosed switching power-supply device includes: a transformer including a primary coil and a secondary coil which is magnetically coupled with the primary coil; a rectifying-and-smoothing circuit connected to the secondary coil; a series circuit, which includes a first switching element and a second switching element and is connected to both ends of a DC power source; a series resonant circuit including a capacitor, which is connected to one end of the second switching element, and the primary coil, which is connected between the capacitor and the other end of the second switching element; a controller that performs switching control to alternately turn on and off the first switching element and the second switching element, with a dead time in which both the first switching element and the second switching element are tuned off; and a resonant-current detection unit that detects a resonant current flowing in the series resonant circuit, wherein in a case where the first switching element is in an ON state at a timing when an absolute value level of the resonant current becomes equal to or less than a threshold value, the controller changes the first switching element to an OFF state and makes a subsequent ON period of the first switching element shorter than a last ON period.

In the disclosed switching power-supply device, the controller includes: a PFM control circuit that controls a switching frequency of the first switching element and the second switching element in response to a current according to an error signal which is a difference between an output voltage of the rectifying-and-smoothing circuit and a target voltage; a soft start circuit that controls the current according to the error signal; and a soft start operation control circuit that controls the soft start circuit to increase the current according to the error signal, in a case where the first switching element is in the ON state at a timing when the absolute value level of the resonant current becomes equal to or less than the threshold value.

In the disclosed switching power-supply device, the soft start circuit includes a time constant circuit including a capacitor, and the soft start operation control circuit performs discharging of the capacitor of the soft start circuit to increase a current according to the error signal.

Another disclosed switching power-supply device includes: a transformer including a primary coil and a secondary coil which is magnetically coupled with the primary coil; a rectifying-and-smoothing circuit connected to the secondary coil; a series circuit, which includes a first switching element and a second switching element and is connected to both ends of a DC power source; a series resonant circuit that includes a capacitor, which is connected to one end of the second switching element, and the primary coil, which is connected between the capacitor and the other end of the second switching element; a controller that performs switching control to alternately turn on and off the first switching element and the second switching element, with a dead time in which both the first switching element and the second switching element are turned off; and a resonant-current detection unit that detects a resonant current flowing in the series resonant circuit, wherein in a case where the second switching element is in an ON state at a timing when an absolute value level of the resonant current becomes equal to or less than a threshold value, the controller switches the second switching element to an OFF state and makes a subsequent ON period of the second switching element shorter than a last ON period.

In the disclosed switching power-supply device, the controller includes: a PFM control circuit that controls a switching frequency of the first switching element and the second switching element in response to a current according to an error signal which is a difference between an output voltage of the rectifying-and-smoothing circuit and a target voltage; a soft start circuit that controls the current according to the error signal; and a soft start operation control circuit that controls the soft start circuit to increase the current according to the error signal, in a case where the second switching element is in the ON state at a timing when the absolute value level of the resonant current becomes equal to or less than the threshold value.

In the disclosed switching power-supply device, the soft start circuit includes a time constant circuit including a capacitor, and the soft start operation control circuit performs discharging of the capacitor of the soft start circuit to increase a current according to the error signal.

The invention claimed is:

1. A switching power-supply device comprising:
    a transformer including a primary coil and a secondary coil which is magnetically coupled with the primary coil;
    a rectifying-and-smoothing circuit connected to the secondary coil;
    an error signal detection circuit, which detects an error signal comprising a difference between an output voltage of the rectifying-and-smoothing circuit and a target voltage;
    a series circuit, which includes a first switching element and a second switching element and is connected to both ends of a DC power source;
    a series resonant circuit including a capacitor, which is connected to one end of the second switching element, and the primary coil, which is connected between the capacitor and the other end of the second switching element;
    a resonant-current detection unit that detects a resonant current flowing in the series resonant circuit,
    a controller that performs switching control to alternately turn on and off the first switching element and the second switching element, with a dead time in which both the first switching element and the second switching element are tuned off,
    wherein the controller includes:
        a PFM control circuit that controls a switching frequency of the first switching element and the second switching element based on the error signal,
        a soft start circuit that controls a reference current based on the error signal so that the switching frequency is gradually increased, and
        a soft start operation control circuit that controls the soft start circuit to increase the reference current, in a case where the first switching element is in an ON state at a timing when an absolute value level of the resonant current becomes equal to or less than a threshold value,
    wherein in a case where the first switching element is in the ON state at the timing when the absolute value level of the resonant current becomes equal to or less than the threshold value, the controller changes the first switching element to an OFF state and controls the soft start circuit to make a subsequent ON period of the first switching element be shorter than a last ON period, which is an ON period immediately before the subsequent ON period.

2. The switching power-supply device according to claim 1, wherein the soft start circuit includes a time constant circuit including a capacitor, and wherein the soft start operation control circuit performs discharging of the capacitor of the soft start circuit to increase the reference current.

3. A switching power-supply device comprising:

a transformer including a primary coil and a secondary coil which is magnetically coupled with the primary coil;

a rectifying-and-smoothing circuit connected to the secondary coil;

an error signal detection circuit, which detects an error signal comprising a difference between an output voltage of the rectifying-and-smoothing circuit and a target voltage;

a series circuit, which includes a first switching element and a second switching element and is connected to both ends of a DC power source;

a series resonant circuit that includes a capacitor, which is connected to one end of the second switching element, and the primary coil, which is connected between the capacitor and the other end of the second switching element;

a resonant-current detection unit that detects a resonant current flowing in the series resonant circuit; and a controller that performs switching control to alternately turn on and off the first switching element and the second switching element, with a dead time in which both the first switching element and the second switching element are turned off; and wherein the controller includes:

a PFM control circuit that controls a switching frequency of the first switching element and the second switching element based on the error signal, a soft start circuit that controls a reference current based on the error signal so that the switching frequency is gradually increased, and a soft start operation control circuit that controls the soft start circuit to increase the reference current, in a case where the second switching element is in an ON state at a timing when an absolute value level of the resonant current becomes equal to or less than a threshold value, wherein in a case where the second switching element is in the ON state at the timing when the absolute value level of the resonant current becomes equal to or less than the threshold value, the controller switches the second switching element to an OFF state and controls the soft start circuit to make a subsequent ON period of the second switching element be shorter than a last ON period, which is an ON period immediately before the subsequent ON period.

4. The switching power-supply device according to claim 3, wherein the soft start circuit includes a time constant circuit including a capacitor, and wherein the soft start operation control circuit performs discharging of the capacitor of the soft start circuit to increase the reference current.

* * * * *